(No Model.)
T. C. O'DONNELL.
CAR COUPLING.
No. 507,686. Patented Oct. 31, 1893.
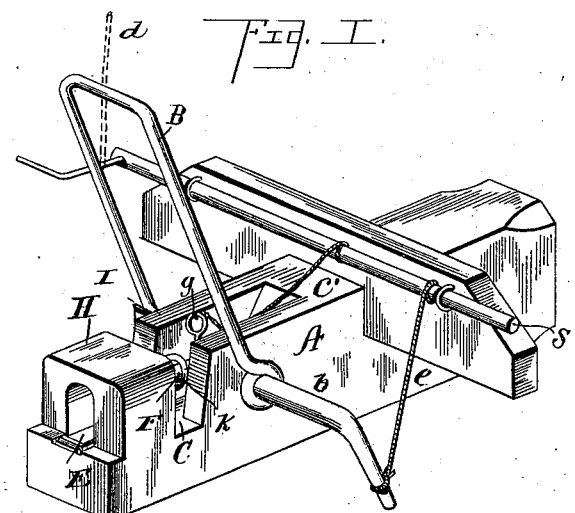
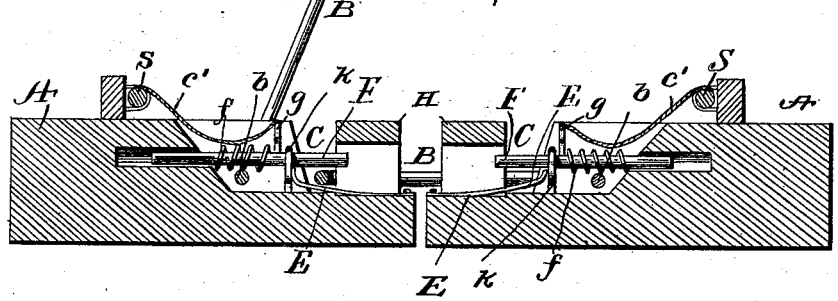
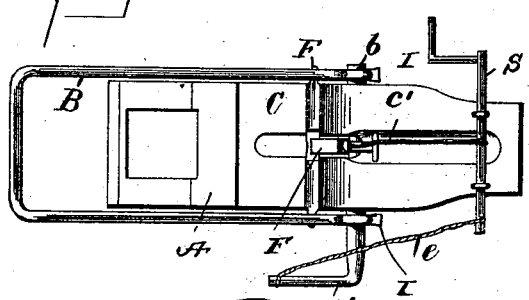
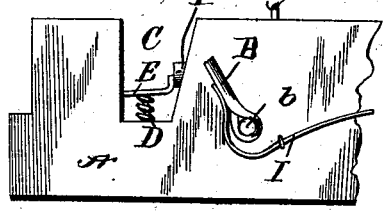
Inventor
Thomas C. O'Donnell,
By John Wedderburn
Attorney
Witnesses

UNITED STATES PATENT OFFICE.

THOMAS C. O'DONNELL, OF WINNEMUCCA, NEVADA.

CAR-COUPLING.

SPECIFICATION forming part of Letters Patent No. 507,686, dated October 31, 1893.

Application filed May 25, 1893. Serial No. 475,497. (No model.)

*To all whom it may concern:*

Be it known that I, THOMAS C. O'DONNELL, of Winnemucca, in the county of Humboldt and State of Nevada, have invented certain new and useful Improvements in Car-Couplers; and I do hereby declare the following to be a full, clear, and exact description of the invention, such as will enable others skilled in the art to which it appertains to make and use the same.

My invention relates to that class of car couplings in which a pivoted bail on the draw-head of one car engages with a nose like projection or hook on an opposing draw-head, and has for its object to provide a simple and efficient coupling device which may be operated without going between cars, thus obviating the danger that is always present where the present type of coupling is used.

This invention consists of a draw-head having a nose like hook or projection, and a pivoted bail, which is automatically thrown out of engagement with the hook on the opposing draw-head.

It further consists in the mechanism for operating said bail from either the side or top of the car. It also consists in means for maintaining the bail in its coupled position.

In the drawings: Figure 1, is a perspective view. Fig. 2, is a vertical longitudinal section. Fig. 3, is a modification of the spring stop. Fig. 4, is another modification. Fig. 5, is a detail elevation of a further modification.

The draw-head A, is provided at its forward end with the nose like projection or hook H, this hook being formed by cutting out a portion of the draw-head, sufficient to allow the entry and slight play of a bail on the opposing draw-head. At a point a short distance to the rear of the depression C, the bail B, is secured to the draw-head on each side. The bail is formed of steel or iron bent into an open ended approximately rectangular shape, and is provided at its rear ends with eyes through which a crank rod $b$, passes, forming a pivot upon which the bail swings. To the end of the crank rod, a rod or chain $d$, is attached which extends to the top of the car, and also a chain $e$, is attached, the other end of said chain $e$, being fastened to a rotary shaft S, which extends across the end of the car, being held in suitable bearings, and is provided at one end with a crank handle.

On one or both sides of the draw-head, a spring I, is secured, the forward end of said spring extending upwardly, and bearing against the bail B, tending normally to throw the bail upwardly to a diagonal or oblique position.

There is an opening in the hook portion of the draw-head, in which is secured a spring plate E, having its front end secured and its free rear end curved upwardly to form a stop or detent for the spring locking device, which is placed in a depression in the draw-head, and consists of a bolt F, surrounded by a coil spring $f$, bearing at its rear end against the draw-head, and at its forward end against the lug $g$, the tendency of said spring being always to throw the bolt F, forward through a keeper $k$, to close the opening C. To the lug $g$, is attached a chain $c'$ the other end of which is attached to the shaft S.

In Fig. 3, a modification of the spring stop E, is shown. In this construction, one or more coiled springs are let into the draw-head within the recess C, and has secured to them, a metal plate having its rear edge upturned, which projects upward in front of the bolt F, when it is withdrawn.

In Fig. 5 a further modification is shown in which a shouldered spring catch F' is employed to engage a cross bar F² of the bail F.

When it is desired to couple two cars having my coupling device, the position of the parts will be as shown in Fig. 1. That is, the spring bolt F, is withdrawn and held in place by the spring plate E, and the bail B, occupies a diagonal position by virtue of the pressure of the spring D, when the two cars have come together by turning the shaft S, from the side of the car, or by pulling on the rod or chain $d$, from the top of the car, the bail is thrown downward into the recess C, of the opposite draw-head, and striking the plate spring E, causes it to sink, thereby releasing the spring bolt F, which shoots over the bail and holds it securely in a locked position. It will be noticed that by the bails being held in a diagonal or oblique position, the bail from the opposing draw-head, when a coupling is being made from that side, forms a sort of deflector, and guides the bail down into the recess, thus insuring certain and positive connection. To uncouple it, it is only necessary to turn the shaft S, on the draw-head, which holds the coupling when the bolt F, will be withdrawn, and spring D, under the arms of the bail B, will throw it up out of engagement with the projection on the draw-head.

In the modification shown in Fig. 4, a pivoted spring catch F, is substituted for the spring bolt F, and a cross bar is attached to the two side bars on the bail, which said cross bar latches under the spring latch when drawn down by means of the crank b' on the bolt b.

Instead of using the chain d, to operate the shaft S, I may provide said shaft with a bevel gear s, which latter gear meshes with a bevel gear s', carried upon the lower end of a vertical shaft S' journaled upon the end of the car. The upper end of this shaft is provided with a hand wheel $s^2$, and by means of which the car can be uncoupled from the top of the car.

Having thus described my invention, what I claim is—

1. In a car coupling, the combination, with the hooked draw-head, of a spring operated bail, a spring actuated latch, a spring actuated stop for said latch, and means for operating said latch, substantially as shown and described.

2. In a car coupling, the combination, with a hooked draw-head, of the spring actuated bail B, crank rod b, chain e, and rotary shaft S, substantially as shown and described.

3. In a car coupling, the combination, with a hooked draw-head, of a spring operated bail B, crank rod b, rod or chain d, chain e, spring stop E, spring latch F, chain c', and rotary shaft S, substantially as shown and described.

4. In a car coupling, the combination, with a hooked draw-head having a spring latch, of a pivoted bail, having cross bar adapted to be engaged by said spring latch, substantially as shown and described.

In testimony whereof I have signed this specification in the presence of two subscribing witnesses.

THOMAS C. O'DONNELL.

Witnesses:
E. L. WILLIAMS,
J. LAVEAGA.